United States Patent
Ishiwari (10) Patent No.: US 10,908,591 B2
(45) Date of Patent: Feb. 2, 2021

(54) MACHINE LEARNING DEVICE AND MACHINING TIME PREDICTION DEVICE

(71) Applicant: FANUC CORPORATION, Yamanashi (JP)

(72) Inventor: Hisateru Ishiwari, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 328 days.

(21) Appl. No.: 15/787,863

(22) Filed: Oct. 19, 2017

(65) Prior Publication Data

US 2018/0120819 A1  May 3, 2018

(30) Foreign Application Priority Data

Oct. 28, 2016  (JP) .................. 2016-212284

(51) Int. Cl.
*G05B 19/414* (2006.01)
*G05B 17/02* (2006.01)
*G05B 19/404* (2006.01)

(52) U.S. Cl.
CPC .......... *G05B 19/414* (2013.01); *G05B 17/02* (2013.01); *G05B 19/404* (2013.01); *G05B 2219/31455* (2013.01); *G05B 2219/32335* (2013.01); *G05B 2219/33034* (2013.01);
(Continued)

(58) Field of Classification Search
CPC ................... G05B 2219/32335; G05B 15/404
See application file for complete search history.

(56) References Cited

U.S. PATENT DOCUMENTS 5,495,430 A * 2/1996 Matsunari ........ G05B 19/41865
703/6
5,673,367 A * 9/1997 Buckley ................. B25J 9/1612
706/23
5,679,053 A   10/1997 Sakakura et al.
(Continued)

FOREIGN PATENT DOCUMENTS

CN   102478810 A   5/2012
CN   105527923 A   4/2016
(Continued)

OTHER PUBLICATIONS

Chen et al, "Improving the machine tool accuracy through machine tool metrology and error correction", 1996, The International Journal of Advanced Manufacturing Technology, 11, pp. 198-205. (Year: 1996).*

(Continued)

*Primary Examiner* — Alexey Shmatov
*Assistant Examiner* — Clint Mullinax
(74) *Attorney, Agent, or Firm* — Hauptman Ham, LLP (57) ABSTRACT

A machine learning device acquires from a numerical controller information relating to machining when the machining is performed, and further acquires an actual delay time due to servo control and due to machine movement which are caused in the machining when the machining is performed. Then, the device performs supervised learning using the acquired machining-related information as input data, and using the acquired actual delay time due to servo control and due to machine movement as supervised data, and constructs a learning model, thereby predicting the machine delay time caused in a machine with high precision.

4 Claims, 7 Drawing Sheets

(52) U.S. Cl.
CPC .............. *G05B 2219/33301* (2013.01); *G05B 2219/39271* (2013.01); *G05B 2219/49181* (2013.01)

(56) References Cited

U.S. PATENT DOCUMENTS

| | | | | |
|---|---|---|---|---|
| 5,804,940 | A * | 9/1998 | Erkens | G05B 19/19 318/560 |
| 6,252,368 | B1 * | 6/2001 | Sugie | G05B 19/404 318/568.22 |
| 6,728,657 | B2 * | 4/2004 | Nakamura | G05B 19/406 700/174 |
| 9,874,865 | B2 * | 1/2018 | Wada | B25J 9/1641 |
| 2003/0110006 | A1 | 6/2003 | Nakamura | |
| 2006/0239386 | A1 | 10/2006 | Endo et al. | |
| 2012/0296462 | A1 | 11/2012 | Otsuki et al. | |
| 2016/0109877 | A1 | 4/2016 | Ishiwari et al. | |

FOREIGN PATENT DOCUMENTS

| | | |
|---|---|---|
| JP | H8-294864 A | 11/1996 |
| JP | 11-28643 A | 2/1999 |
| JP | 2003-175439 A | 6/2003 |
| JP | 2004-227028 A | 8/2004 |
| JP | 2006-301930 A | 11/2006 |
| JP | 2012-243152 A | 12/2012 |
| JP | 2014-38482 A | 2/2014 |

OTHER PUBLICATIONS

Tomizuka, "Model based prediction preview and robust controls in motion control system", 1996, Proc. IEEE/IES AMC, vol. 1, pp. 1-6. (Year: 1996).*
Gloye et al, "Predicting away robot control latency". In Polani et al (Eds.),"LNCS. RoboCup 2003: robot soccer world cup VII" (pp. 712-719), Padua, Italy. (Year: 2003).*
Di Angelo et al, "A neural network-based build time estimator for layer manufactured objects", 2011, Int. J. Adv. Manuf. Technol., 57, pp. 215-224. (Year: 2011).*
Sun et al, "Effective training data selection in tool conditioning monitoring system", 2005, International Journal of machine Tool & Manufacturing, 46, pp. 218-224. (Year: 2005).*
Jamone et al, "James: A Humanoid Robot Acting over an Unstructured World", 2006, 6th IEEE-RAS International Conference on Humanoid Robots, pp. 143-150. (Year: 2006).*
Dekel et al, "The Forgetron: A Kernel-Based Perceptron on a Budget", 2008, SIAM Journal on Computing, vol. 37, Issue 5, pp. 1342-1372. (Year: 2008).*
Gijsbert et al, "Real-Time learning using Incremental Sparse Spectrum Gaussian Regression", 2013, Neural Networks, vol. 41, pp. 59-69. (Year: 2013).*
Office Action in JP Application No. 2016-212284, dated Apr. 3, 2018, 7pp.
Office Action in Japanese Application No. 2016-212284, dated Aug. 21, 2018, 7pp.
Office Action for corresponding Chinese application No. 2017110214142 dated Aug. 28, 2019; 15 pgs.

* cited by examiner

| WORKPIECE MATERIAL | NUMERICAL VALUE |
|---|---|
| IRON | 1 |
| ALUMINUM | 2 |
| STEEL | 3 |
| ⋮ | ⋮ |

| KIND OF MACHINING | NUMERICAL VALUE |
|---|---|
| TURNING | 1 |
| MILLING | 2 |
| ENDMILLING | 3 |
| ⋮ | ⋮ |

| SET OF PROGRAM COMMANDS | NUMERICAL VALUE |
|---|---|
| (G00, G01) | 1 |
| (G01, G00) | 2 |
| (G00, G00) | 3 |
| ⋮ | ⋮ |
| (G28) | 22 |
| ⋮ | ⋮ |

- THE CASE WHERE DELAY OF SERVO CONTROL AND MACHINE MOVEMENT IS CAUSED DURING EXECUTION OF ONE COMMAND

| TIME | PROGRAM COMMAND | MOVEMENT AMOUNT FOR EACH CONTROL CYCLE | ERROR AMOUNT FOR EACH CONTROL CYCLE |
|---|---|---|---|
| 100 | G28 X3.Z5. | 200 | |
| 200 | | 200 | 5 |
| 300 | | | 5 |
| 400 | | 200 | |
| 500 | | 200 | 5 |
| 600 | | 200 | 5 |
| 700 | | 200 | 5 |

ACTUAL DELAY TIME DUE TO SERVO CONTROL AND DUE TO MACHINE MOVEMENT WHEN TIME AT WHICH ONLY ERROR AMOUNT FOR EACH CONTROL CYCLE IS OUTPUTTED IS GENERATED BETWEEN PRECEDING AND SUCCEEDING PROGRAM COMMANDS

FIG. 6B

- THE CASE WHERE DELAY OF SERVO CONTROL AND MACHINE MOVEMENT IS CAUSED BETWEEN EXECUTIONS OF TWO COMMANDS

| TIME | PROGRAM COMMAND | MOVEMENT AMOUNT FOR EACH CONTROL CYCLE | ERROR AMOUNT FOR EACH CONTROL CYCLE |
|---|---|---|---|
| 100 | G00 X10 | 200 | |
| 200 | | 200 | 5 |
| 300 | | 200 | 5 |
| 400 | | 200 | 5 |
| 500 | | | 5 |
| 600 | | | 2 |
| 700 | G01 X20 | 200 | |

ACTUAL DELAY TIME DUE TO SERVO CONTROL AND DUE TO MACHINE MOVEMENT WHEN TIME AT WHICH ONLY ERROR AMOUNT FOR EACH CONTROL CYCLE IS OUTPUTTED IS GENERATED BETWEEN PRECEDING AND SUCCEEDING PROGRAM COMMANDS

MACHINE LEARNING DEVICE AND MACHINING TIME PREDICTION DEVICE

RELATED APPLICATIONS

The present application claims priority to Japanese Application Number 2016-212284 filed Oct. 28, 2016, the disclosure of which is hereby incorporated by reference herein in its entirety.

BACKGROUND OF THE INVENTION

1. Field of the Invention

The present invention relates to a machine learning device and a machining time prediction device. More particularly, the present invention relates to a machine learning device that learns a delay time due to servo control and due to machine movement with respect to a machining status, and to a machining time prediction device.

2. Description of the Related Art

In the case of machining a workpiece by a machine tool, generally, when the machining speed is increased in order to shorten the machining time, the machining precision is deteriorated. Conversely, when the machining speed is reduced in order to lengthen the machining time, the machining precision is improved. For this reason, a user who machines a workpiece by a machine tool wishes to machine a workpiece with a machining precision within a previously set machining error tolerance for the minimum machining time. However, it is not possible to readily find the relationship between how long machining time machining is performed and the resulting degree of machining error with which the workpiece can be machined.

Under such circumstances, various trials and errors have been repeated such as a trial of shortening the machining time while keeping the machining precision by performing trial machining while changing the setting of parameters, and the like, and prediction of the machining precision and the machining time by performing simulation without performing trial machining.

Main prior-art technologies regarding performing of prediction on the machining time include those disclosed in Japanese Patent Application. Laid-Open No. 2003-175439, Japanese Patent Application Laid-Open No. 2012-243152, Japanese Patent Application Laid-Open No. 11-028643, and Japanese Patent Application Laid-Open No. 2014-038482, and Journal of Technical Disclosure No. 2012-502270.

Japanese Patent Application Laid-Open. No. 2003-175439 discloses a technology of accumulating the times of the auxiliary function on a per auxiliary code basis, and reflecting the mean value on the predicted machining time, and thereby predicting a correct machining time. Japanese Patent Application Laid-Open No. 2012-243152 discloses a technology of enabling more correct prediction of the machining time and the machining error by simulating the servo movement. Japanese Patent Application Laid-Open. No. 11-028643 discloses a technology of measuring the time taken for actual machining during machining and adding the predicted machining time to the actual machining time, thereby predicting a more correct machining time than using only the predicted machining time. Further, Japanese Patent Application Laid-Open No. 2014-038482 discloses the following technology: the tool path is divided into segments each of which is a smaller unit than a block; thus, in consideration of the processing power of the numerical controller, the travel times in the segments are summed up to determine the machining time, thereby enabling the correct machining time prediction in consideration of the acceleration/deceleration time and the order of execution of programs. Further, with the technology disclosed in Journal of Technical Disclosure No. 2012-502270, the delay due to acceleration/deceleration, the delay due to servo control, and the delay in movement of a machine are calculated, thereby predicting the machining time.

Figure 6A:
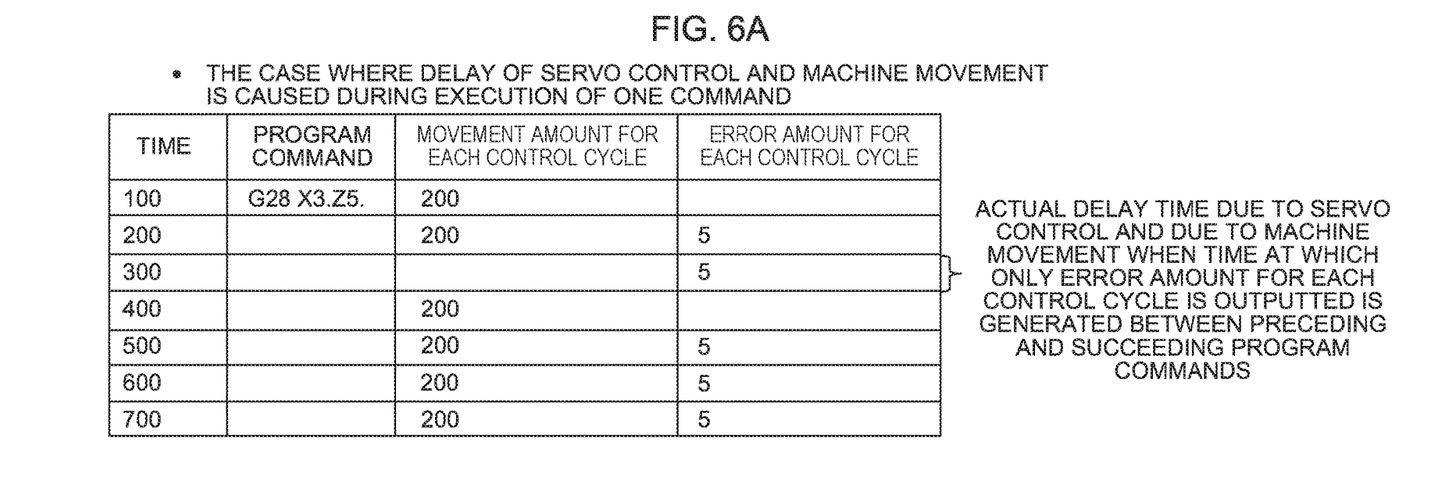
FIGS. 6A and 6B are each a view for illustrating a measuring method of the actual delay time due to servo control and due to machine movement by a label acquisition part.
Figure 6B:
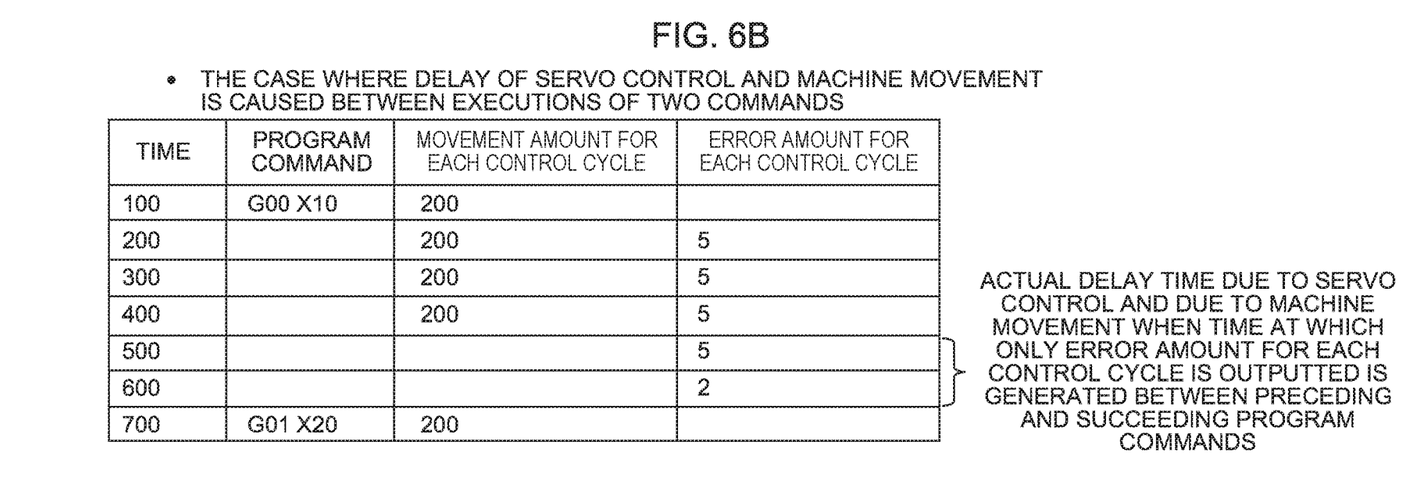

Generally, when a machine is operated, due to the movement delay based on the frictional force generated at each part, the movement delay caused by the delay in a feedback system, or the inertia, and the like, so-called machine delays such as a delay due to acceleration/deceleration, a delay due to servo control, and a delay in movement of a machine are caused (FIGS. 6A and 6B). However, with the technologies disclosed in Japanese Patent Application Laid-Open. No. 2003-175439 and Japanese Patent Application Laid-Open No. 2012-243152, such machine delays are not considered, so that unfavorably, an error is caused in the machining time prediction results. Whereas, with the technology disclosed in Japanese Patent Application Laid-Open No. 11-028643, the prediction precision increases at a time close to completion of machining, but at the initial stage of machining, the machine delay is not sufficiently reflected on the predicted results, so that an error is caused in the machining time prediction results. Further, with the technologies disclosed in Japanese Patent Application Laid-Open No. 2014-038482, Journal of Technical Disclosure No. 2012-502270, although the calculation of the times of the machine delay is suggested, a concrete method for calculating the times of the machine delay is not disclosed. Further, each machine has a different machine delay characteristic. For this reason, even if the calculation method is disclosed, it is difficult to adapt the method to all the kinds of machine delays. This makes impossible the correct prediction.

Generally, the machine delay increases when the control target is subjected to acceleration/deceleration. Thus, it can be considered that the high precision prediction of the machining time can be performed in the following manner: the divergence time between the predicted machining time and the actual machining time caused by the machine delay is previously measured experimentally, or by other methods; and the predicted machining time is corrected from, the measured divergence time and the number of accelerations/decelerations in machining. However, in actuality, the machine delay generated during execution of one command included in the machining program or between two consecutive program commands (e.g., the machine delay caused during execution of G28 command or machining cycle command, and the machine delay caused between G00 command and G01 command when the G01 command is executed next to the G00 command) varies according to various elements such as the classifications of the commands, the set of the two program command classifications (the combination with the sequence), the weight of the workpiece, and the machining speed. For this reason, even when the divergence time is simply measured and used, there is unfavorably a limit on the improvement of the prediction precision of the machining time.

SUMMARY OF THE INVENTION

Under such circumstances, an object of the present invention is to provide a machine learning device capable of predicting the machine delay time caused at a machine with a higher precision.

In the present invention, the foregoing problem is solved by introducing machine learning (supervised learning) into the prediction of the machining time. A machine learning device of the present invention performs learning based on various data such as the movement amount for each control cycle acquired in test machining actually performed with a machine, the program command or a set of program commands, the machining speed, and the weight of a workpiece, and the delay time due to servo control and due to machine movement, and constructs a learning model for predicting the delay time due to servo control and due to machine movement from input data such as the movement amount for each control cycle, the program command or a set of program commands, the machining speed, and the weight of the workpiece. After completion of construction of the learning model, simulation is performed on the program, which is desired to be predicted on the resulting machining time, thereby to determine the same input data as those used for learning. The determined input data are given to the machine learning device of the present invention, thereby to predict the delay time due to servo control and due to machine movement. Then, the calculated delay time due to servo control and due to machine movement s added to the conventional machining time predicted result in which the conventional delay time due to servo control and due to machine movement is not considered. As a result, it becomes possible to predict the machining time with a higher precision.

A first aspect of the machine learning device in accordance with the present invention learns a delay time due to servo control and due to machine movement, which are caused when performing machining on a workpiece based on a machining program in a numerical controller for controlling a machine having at least one axis based on the machining program. The machine learning device includes a status observation part that acquires information relating to the machining from the numerical controller when the machining is performed; a label acquisition part that acquires an actual delay time due to servo control and due to machine movement, which are caused in the machining when the machining is performed; a learning part that performs supervised learning using the information relating to the machining acquired by the status observation part as input data, and using the actual delay time due to servo control and due to machine movement acquired by the label acquisition part as supervised data, and constructs a learning model; and a learning model storage part that stores the learning model therein.

The information relating to the machining can include at least any of information relating to a command which has caused the delay time due to servo control and due to machine movement, and information relating to a set of preceding and succeeding consecutive program commands.

A second aspect of the machine learning device in accordance with the present invention predicts a delay time due to servo control and due to machine movement, which are caused when performing machining on a workpiece based on a machining program in a numerical controller controlling a machine having at least one axis based on the machining program. The machine learning device includes: a learning model storage part that stores a learning model constructed by supervised learning using information relating to the machining as input data, and using an actual delay time due to servo control and due to machine movement, which are caused in the machining, as supervised data; a status observation part that acquires information relating to machining of the workpiece based on the machining program calculated from machining simulation based on the machining program; and a prediction part that predicts a delay time due to servo control and due to machine movement from the information relating to the machining acquired by the status observation part based on the learning model.

The information relating to the machining can include at least any of information relating to a command which has caused the delay time due to servo control and due to machine movement, and information relating to a set of preceding and succeeding consecutive program commands.

Further, a machining time prediction device in accordance with the present invention includes: a reference machining time prediction part that predicts a reference machining time not including a delay time due to servo control and due to machine movement based on a machining program; a correction time calculation part that calculates a correction time for correcting the reference machining time based on a delay time due to servo control and due to machine movement predicted from the machining program by the second aspect of the machine learning device in accordance with the present invention; and a machining time prediction part that calculates a predicted machining time obtained by correcting the reference machining time by the correction time.

The present invention enables higher precision machining time prediction with reference to the characteristics of a machine tool such as the delay of servo control and machine movement.

DETAILED DESCRIPTION OF THE PREFERRED EMBODIMENTS

Figure 1:
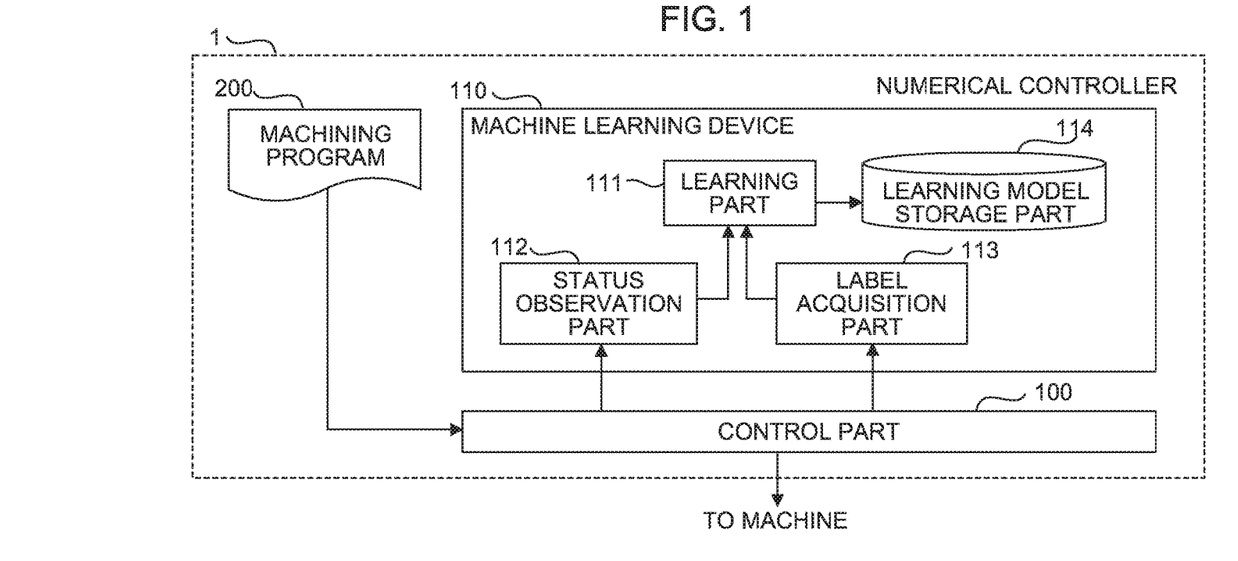
FIG. 1 is a schematic functional block diagram of a machine learning device during learning in accordance with one embodiment of the present invention.

FIG. 1 is a schematic functional block diagram of a machine learning device during learning in accordance with one embodiment of the present invention.

A machine learning device 110 of the present embodiment is internally included in a numerical controller 1, and acquires each information from a control part 100 when a control part 100 of the numerical controller 1 performs machining based on a machining program 200. Incidentally, the machine learning device 110 is not required to be internally included in the numerical controller 1, and may assume an externally connected form so long as it can acquire each information described later from the numerical controller 1.

Before explaining each configuration included in the machine learning device 110, the outline of learning performed by the machine learning device 110 will be described by reference to FIG. 2.

Figure 2:
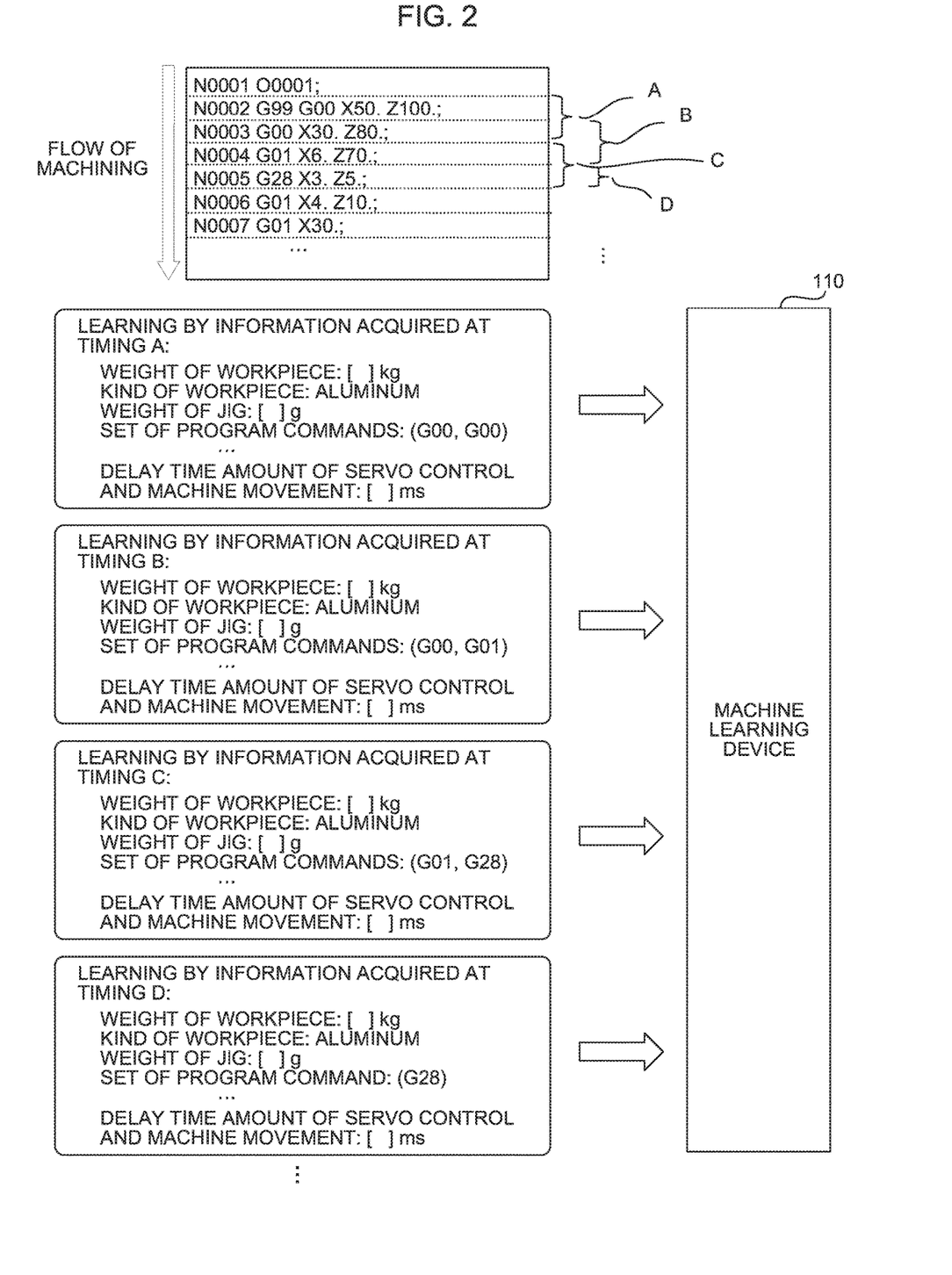
FIG. 2 is a view for illustrating the outline of leaning performed by the machine learning device.

As described above, the delay time due to servo control and due to machine movement may be caused during execution of one command e.g., D of FIG. 2), and during preceding and succeeding two consecutive program commands (e.g., A, B, and C of FIG. 2) in the flow of machining during execution of a machining program. Thus, the machine learning device 110 acquires information from each part of the numerical controller 1 while monitoring the execution status of the machining program during execution of the machining program 200 at the numerical controller 1. Thus, using the time at which a given program command is executed, and at a time when upon completion of execution of a given program command, execution of the subsequent block is started (at the timing of transition of block execution by the numerical controller 1) as a learning timing, the machine learning device 110 performs machine learning based on each information acquired at the learning timing (A, B, C, D, or the like). The machine learning device 110 may thus perform learnings for the number of times of {the number of blocks except for the program number of the machining program 200+(the number of blocks except for the program number of the machining program 200−1)} at maximum during execution of the machining program 200 by the numerical controller 1. Incidentally, the machine learning device 110 may omit, from the objects of learning, the timing at which it is previously known that machine delay is not caused.

Then, returning to FIG. 1, each configuration included in the machine learning device 110 will be described. The machine learning device 110 includes a learning part 111, a status observation part 112, a label acquisition part 113, and a learning model storage part 114.

The learning part 111 performs supervised learning using machining-related information acquired from each part of the numerical controller 1 by the status observation part 112 as input data, and the actual delay time due to servo control and due to machine movement, which are caused in machining acquired by the label acquisition part 113 as supervised data (which is also referred to as label), thereby to construct a learning model, and stores the learning model in the learning model storage part 114. The learning model constructed by the learning part 111 is, as described later, used for estimation of the delay time due to servo control and due to machine movement. For the learning model constructed by the learning part 111, any model may be used so long as it is a learning model capable of learning and predicting the delay time due to servo control and due to machine movement from information relating to machining. For example, multi-layer neural networks described later, Bayesian network, and the like can be used.

Figure 3:
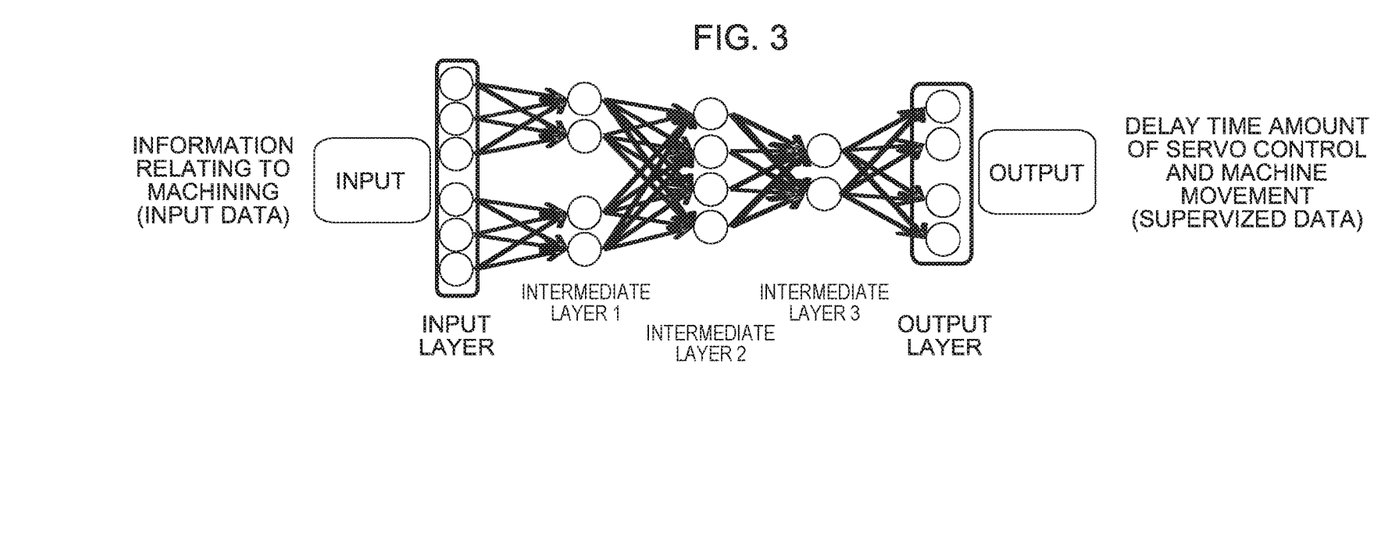
FIG. 3 is a view showing an example of the case using multi-layer neural networks as a learning model.

As an example, for example, when the multi-layer neural network as shown in FIG. 3 is used as a learning model, data related to machining performed at the numerical controller 1 is given as input data, and the actual delay time due to servo control and due to machine movement, which are caused when performing the machining is given as supervised data. Thus, learning is advanced by the method such as deep learning. Incidentally, a description on the details of known neural networks, deep learning, and the like is omitted in the present specification.

Returning to FIG. 1, the status observation part 112 acquires machining-related information from each part of the numerical controller 1, and outputs the acquired information to the learning part 111. The machining-related information acquired by the status observation part 112 includes data of machining conditions (the weight of a workpiece, the kind of a workpiece, the weight of a jig, and the kind of machining), data of actual machining (the time of day, one command at a learning timing, or the set of consecutive two program commands preceding and succeeding the learning timing), the movement amount for each control cycle, and the like.

The status observation part 112 acquires machining-related information from each information set in a set region on a memory (not shown) of the numerical controller 1, the drawing data or the machining program 200 stored on a memory (not shown), the signal inputted from each sensor to the numerical controller 1, and the like. For example, for the material of the workpiece, or the like, fixed information may be acquired from drawing data. For the weight of a workpiece, or the like, a fixed value may be acquired based on drawing data, or the like. However, it is also acceptable that the actual weight of the workpiece is acquired at each timing from the weight sensor mounted on a workpiece base so as to enable more strict learning.

Figure 4:
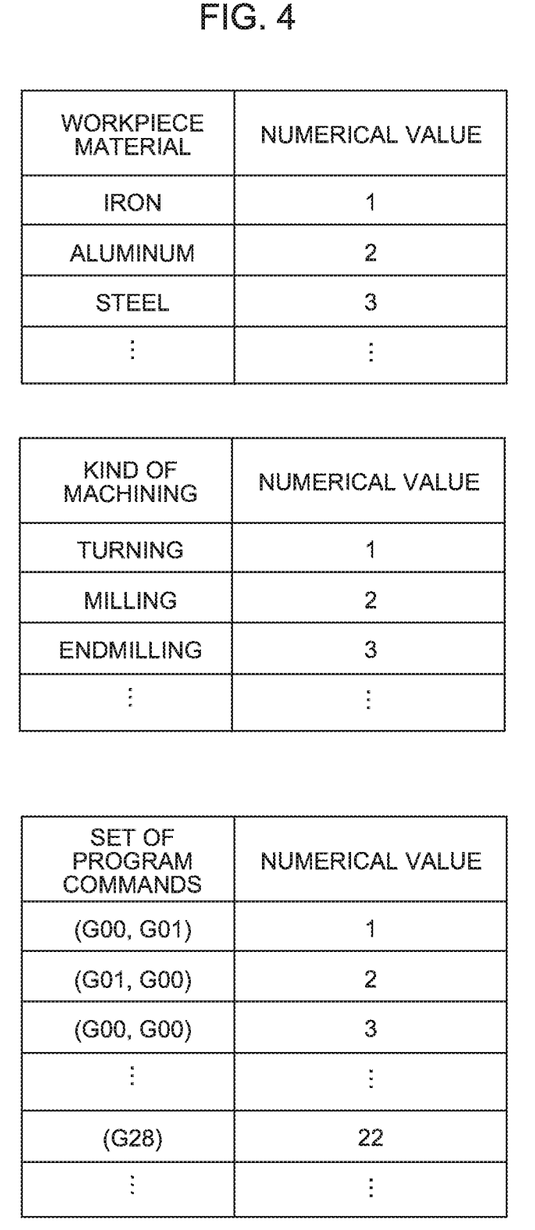
FIG. 4 is a view for illustrating the numerical conversion of input data.

When the machining-related information acquired by the status observation part 112 includes information other than numerical values such as character string, for example, the conversion table as shown in FIG. 4 is previously stored on a memory (not shown). Using the conversion table, other information than numerical values may be converted into numerical values.

The label acquisition part 113 measures and acquires the actual delay time by servo control and machine movement, which are caused during execution of the machining program by the numerical controller 1, and outputs the measured actual delay time by servo control and machine movement to the learning part 111.

Below, a description will be given the measurement method of the actual delay time by servo control and machine movement by the label acquisition part 113.

Figure 5:
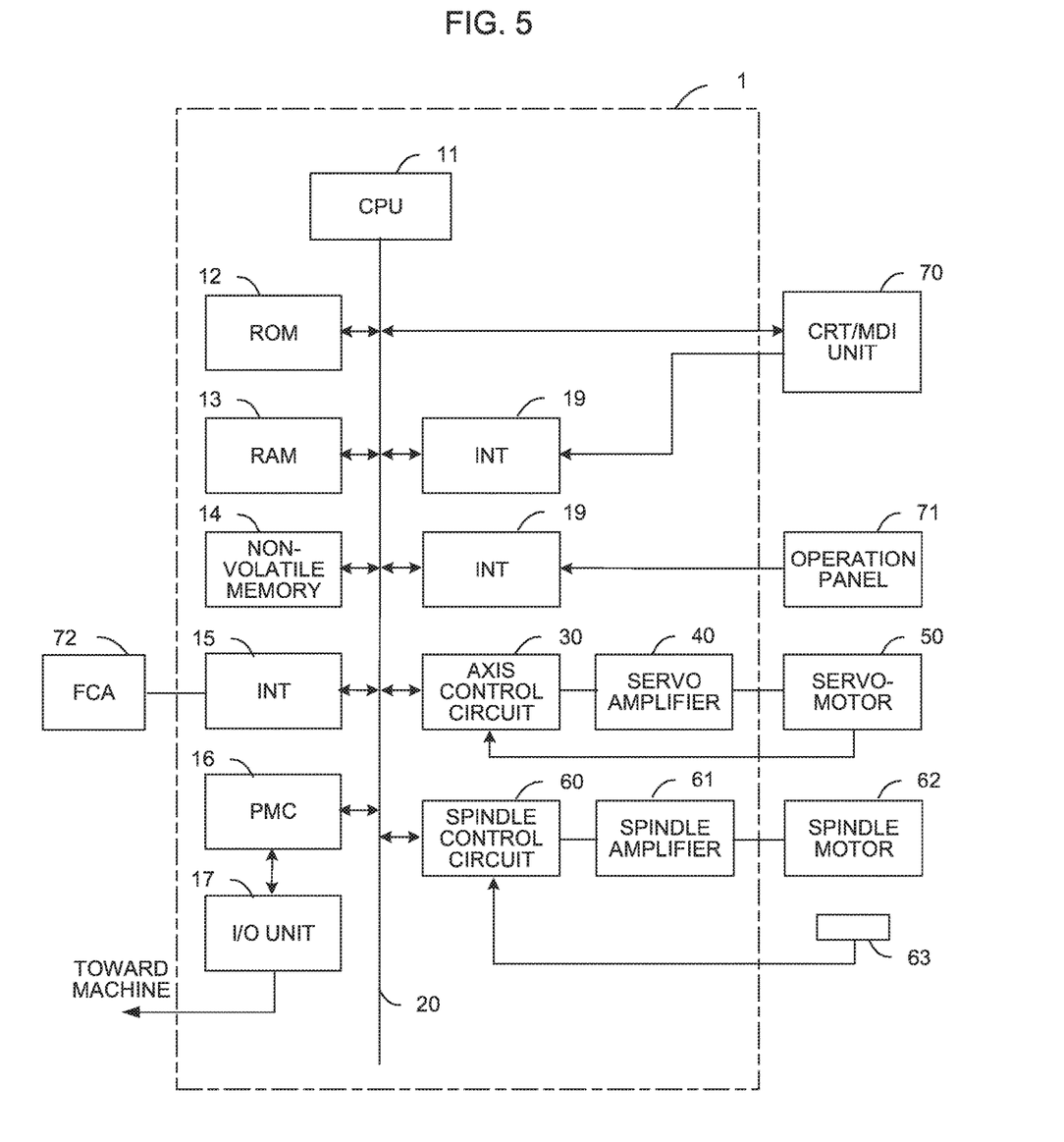
FIG. 5 is a hardware block diagram showing the essential parts of a general numerical controller.

First, FIG. 5 shows a hardware block diagram showing the essential parts of a general numerical controller, and a machine tool driven and controlled by the numerical controller.

A CPU 11 included in the numerical controller 1 is a processor for collectively controlling the numerical controller 1. The CPU 11 reads a system program stored in a ROM 12 via a bus 20, and controls the whole numerical controller 1 according to the system program. A RAM 13 stores therein temporary calculation data, display date, various data inputted via a CRT/MDI unit 70 by an operator, and the like.

A nonvolatile memory 14 is subjected to back-up by, for example, a battery (not shown), or the like, and is formed as a memory whose storage state is held even when the power supply of the numerical controller is turned off. The nonvolatile memory 14 stores therein the machining program read via an interface 15, and the machining program inputted via a CRT/MDI unit 70 described later. The nonvolatile memory 14 further stores a machining program operation processing program used for operating the machining program, a machining time prediction processing program, and the like. The programs are expanded in the RAM 13 for execution. Further, in the ROM 12, various system/programs for executing processing of the editing mode required for forming and editing the machining program are previously written.

The interface 15 is an interface for connecting the numerical controller 1 and an external device 72 such as an adaptor. From the external device 72 side, the machining program, various parameters, and the like are read. Further, the machining program edited in the numerical controller 1 can be stored in external storage means via the external device 72. A programmable machine controller (PMC) 16 outputs a signal to a peripheral device of the machine tool (e.g., an actuator such as a robot hand for tool exchange) via an I/O unit 17 by the sequence program included in the numerical controller 1, for control. Further, the PMC 16 receives signals from various switches of the operation panel arranged in the main body of the machine tool, and the like, and performs a necessary signal processing, and then, passes the signals to the CPU 11.

The CRT/MDT unit 70 is a manual data input device including a display, a keyboard, and the like. An interface 18 receives a command and data from the keyboard of the CRT/MDI unit 70, and passes them to the CPU 11. An interface 19 is connected to an operation panel 71 including a manual pulse generator, and the like.

An axis control circuit 30 for controlling the axis included in the machine tool receives a movement command amount of the axis from the CPU 11, and outputs the command of the axis to a servo amplifier 40. The servo amplifier 40 receives the command, and drives a servomotor 50 for moving the axis included in the machine tool. The servomotor 50 of the axis includes a position/speed detector, and feeds back a position/speed feedback signal from the position/speed detector to the axis control circuit 30, and performs feedback control of position/speed. Incidentally, the hardware block diagram of FIG. 1 shows only one axis control circuit 30, one servo amplifier 40, and one servomotor 50. However, in actuality, they are respectively provided in a number equivalent to the number of axes included in the machine tool.

A spindle control circuit 60 receives a spindle rotation command to the machine tool, and outputs a spindle speed signal to a spindle amplifier 61. The spindle amplifier 61 receives the spindle speed signal, and rotates a spindle motor 62 of the machine tool at the commanded rotation speed, and drives the tool.

The spindle motor 62 is coupled with a position detector 63 by a gear, a belt, or the like. The position detector 63 outputs a feedback pulse in synchronization with the rotation of the spindle. The feedback pulse is read by the CPU 11.

Incidentally, the control part 100 included in the numerical controller 1 shown in FIG. 1 is functional means implemented by the CPU 11 for executing the analysis processing of the machining program 200, the axis control circuit 30 for controlling each axis, the servo amplifier 40, the spindle control circuit 60, the spindle amplifier 61, and the like.

FIGS. 6A and 6B are each a view for illustrating the measurement method of the actual delay time due to servo control and due to machine movement by the label acquisition part 113.

When the program command for axis control included in the machining program 200 is executed, the program command is analyzed in the numerical controller 1. Based on the analysis result, the movement amount for each control cycle outputted to the servomotor 50 is generated. The generated movement amount for each control cycle is outputted to the servomotor 50 via the axis control circuit 30 and the servo amplifier 40 on a per control cycle basis. The servomotor 50 moves as much as the movement amount for each control cycle. The feedback of position/speed is returned from the servomotor 50 to the axis control circuit 30. For various reasons (such as the movement delay based on the frictional force generated at each part of the machine, and the movement delay caused by the delay in a feedback system, or inertia), a deviation is caused between the position at which the servomotor 50 should primarily move during the control cycle and the actual position of the servomotor 50. The movement amount for each control cycle equivalent to the deviation amount becomes an error amount, which is outputted in order to compensate the deviation of the position during the next control cycle.

The label acquisition part 113 monitors the output status of the movement amount and the output status of the error amount for each control cycle of each program command, and measures the time during which the movement amount for each control cycle is not outputted and only the error amount is outputted, and takes the measured time as the actual delay time due to servo control and due to machine movement. The actual delay time due to servo control and due to machine movement may be caused during execution of one command (FIG. 6A), or between preceding and succeeding consecutive two program commands (FIG. 6B). For this reason, the measured actual delay time due to servo control and due to machine movement is used for learning in association with one command or a set of preceding and succeeding consecutive two program commands. Incidentally, for the label acquisition part 113, for example, a real time clock (RIO) (not shown) included in the numerical controller 1 or the machine learning device 110 is used for measuring the time.

With the foregoing configuration, each time machining based on the machining program 200 is performed at the numerical controller 1, the machine learning device 110 can advance learning based on the machining-related information acquired from each part of the numerical controller 1 by the status observation part 112 and the actual delay time due to servo control and due to machine movement, which are caused in machining measured and acquired by the label acquisition part 113, thereby to construct a learning model.

Then, a description will be given to the machine learning device 110 for predicting the delay time due to servo control and due to machine movement using the constructed learning model.

Figure 7:
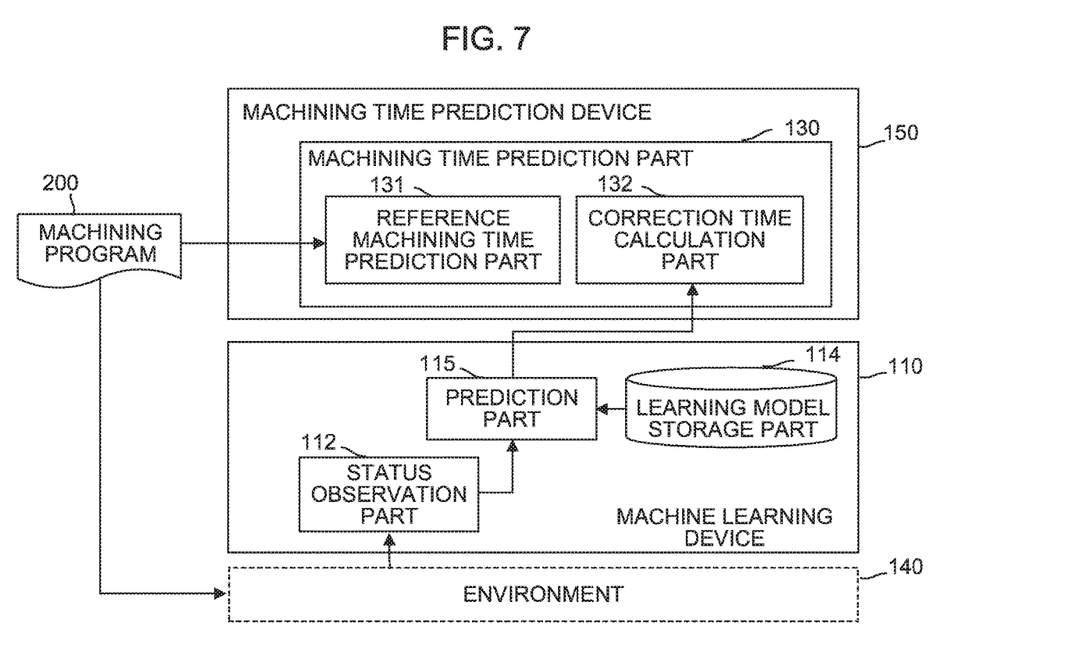
FIG. 7 is a schematic functional block diagram of a machine learning device during use in accordance with one embodiment of the present invention.

FIG. 7 is a schematic functional block diagram of a machine learning device during delay time prediction in accordance with one embodiment of the present invention. The machine learning device 110 of the the present embodiment is connected with an environment 140 such as a PC or a numerical control machining simulator, and a machining time prediction device 150 including a machining time prediction function of the machining program 200 to be used.

The machine learning device 110 includes a status observation part 112, a learning model storage part 114, and a prediction part 115.

The status observation part 112 acquires the same information as the machining-related information used as the input data for learning from the results analyzed or simulated by the machining program 200 at the environment 140, and outputs the acquired information to the prediction part 115. The status observation part 112 acquires information relating to machining at the timing of execution of one command, or the timing between executions of preceding and succeeding two consecutive commands when the machining program 200 is provisionally executed. The status observation part 112 handles the value acquired from the environment 140 as the value when machining has been actually performed. As the machining-related information acquired by the status observation part 112, mention may be made of, as with the case of the time of learning, data of the machining conditions (the weight of the workpiece, the kind of the workpiece, the weight of the jig, and the kind of machining), actual data of machining (the time of day, one command at the acquisition timing, and the set of consecutive two program commands preceding and succeeding the acquisition timing), the movement amount for each control cycle, and the like. When the machining-related information acquired by the status observation part 112 includes other information than the numerical values such as character string, for example, the conversion table as shown in FIG. 4 is previously stored on a memory (not shown). Using the conversion table, other information than numerical values may be converted into numerical values.

The prediction part 115 performs prediction of the delay time due to servo control and due to machine movement using the learning model using the machining-related information acquired from the environment 140 by the status observation part 112 as input data, and stored in the learning model storage part 114.

As an example, when the multi-layer neural network shown in FIG. 3 is used as a learning model, by giving the machining-related data obtained as the input data to the multi-layer neural networks, the predicted value of the delay time due to servo control and due to machine movement is outputted.

In this manner, the prediction part 115 predicts the delay time due to servo control and due to machine movement, which are caused between respective blocks of the machining program 200, and outputs the predicted delay time due to servo control and due to machine movement to the machining time prediction device 150. The machining time prediction device 150 passes the predicted delay time due to servo control and due to machine movement received from the machine learning device 110 to a correction time calculation part 132 included in the machining time prediction part 130.

The machining time prediction device 150 is a device to be mounted in a form such as a PC, a simulation device, or a numerical controller, and is a device for more precisely predicting the machining time taken for machining by the machining program 200 based on the machining program 200 and the predicted value of the delay time due to servo control and due to machine movement received from the machine learning device 110. The machining time prediction device 150 includes the machining time prediction part 130.

The machining time prediction part 130 predicts the machining time taken for machining by the machining program 200. The machining time prediction part 130 includes a reference machining time prediction part 131, and a correction time calculation part 132.

The reference machining time prediction part 131 analyzes the machining program 200 to be the prediction target for the machining time, and predicts the machining time in which the delay time due to servo control and due to machine movement taken for the machining based on the machining program 200 is not considered. For the prediction of the machining time in which the delay time due to servo control and due to machine movement is not considered, for example, the prior-art technologies disclosed in the Japanese Patent Application Laid-Open No. 2003-175439, Japanese Patent Application Laid-Open No. 2012-243152, and the like can be used.

The correction time calculation part 132 adds up the delay times due to servo control and due to machine movement, which are caused between respective blocks of the machining program 200, outputted from the prediction part 115 included in the machine learning device 110, thereby to calculate the correction time.

Then, the machining time prediction part 130 adds the correction time calculated by the correction time calculation part 132 to the machining time in which the delay time due to servo control and due to machine movement related to machining based on the machining program 200, calculated by the reference machining time prediction part 131, is not considered thereby to calculate the predicted machining time in which the delay time due to servo control and due to machine movement is considered.

In this manner, the machine learning device 110 having the learning model resulting from learning using the machining-related information obtained when machining is performed by the numerical controller 1 as input data, and the actual delay time due to servo control and due to machine movement as supervised data, can predict the delay time due to servo control and due to machine movement which are caused during machining using the machining program 200 by using each information obtained by analyzing or simulating the machining program 200 to be the prediction target for the machining time as the machining-related information. Then, the machining time prediction device 150 uses the delay time due to servo control and due to machine movement predicted by the machine learning device 110, and thereby can predict the machining time taken for machining by the machining program 200 with more precision.

Figure 8:
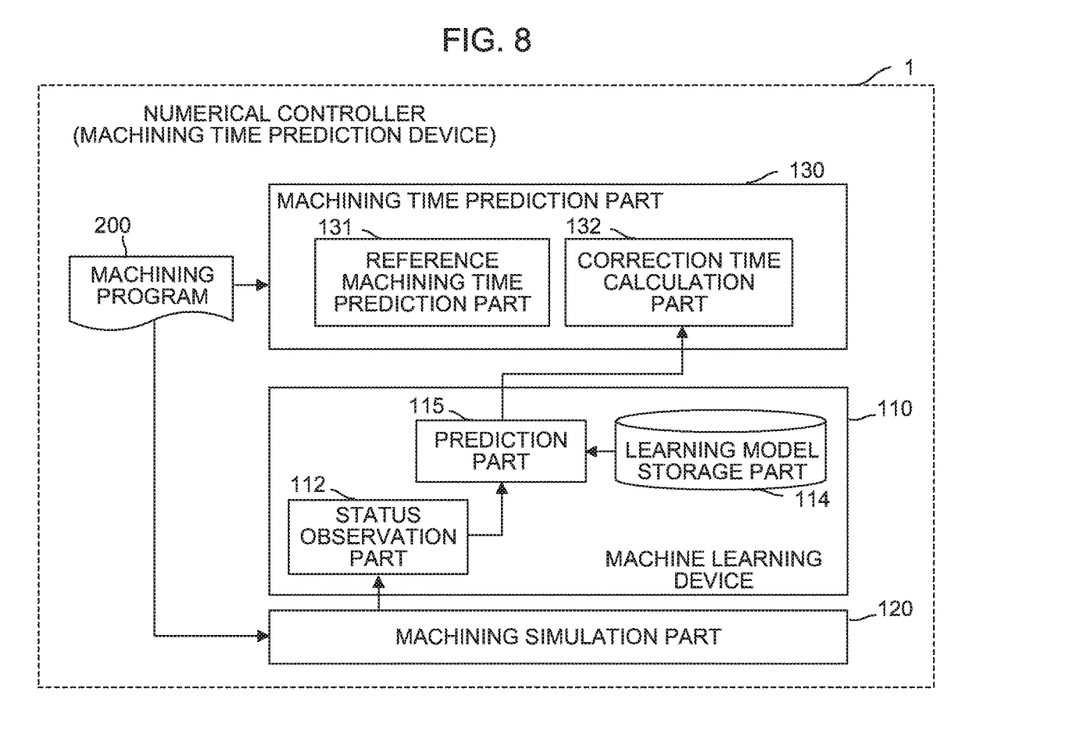
FIG. 8 is a schematic functional block diagram of a machine learning device during use in accordance with another embodiment of the present invention.
Figure 9:
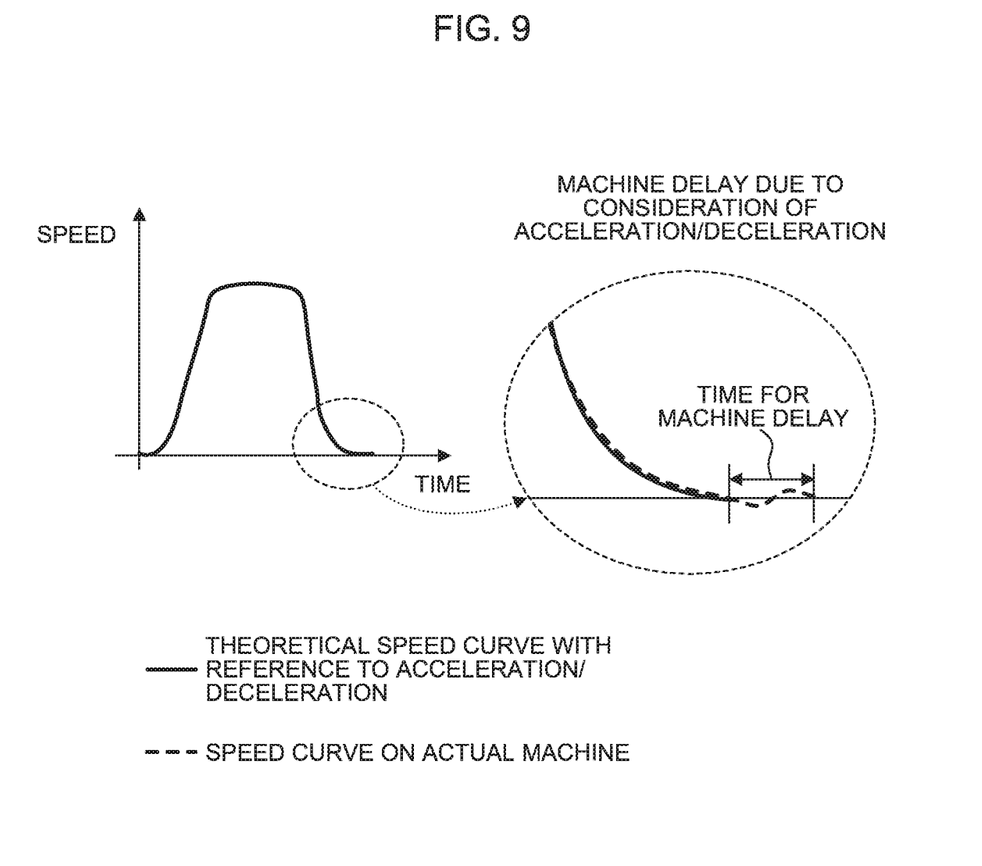
FIG. 9 is a view for illustrating the machine delay.

FIG. 8 shows an embodiment when the machine learning device 110 is incorporated in the numerical controller 1. The numerical controller 1 of FIG. 8 corresponds to the machining time prediction device 150 shown in FIG.

The machine learning device 110 of the present embodiment is internally included in the numerical controller 1 having a machining time prediction function, and a machining simulation function, and predicts the delay time due to servo control and due to machine movement which are caused during execution of the machining program 200 based on each information obtained by machining simulation based on the machining program 200 when the numerical controller 1 performs prediction of the machining time taken for machining by the machining program 200. Further, the machining simulation part 120 corresponds to the environment 140 shown in FIG. 7. Incidentally, the machine learning device 110 of the present embodiment is not required to be internally included in the numerical controller 1, and may assume an externally connected form so long as it can acquire each information described later from the numerical controller 1.

The status observation part 112 of the present embodiment acquires the same information as the machining-related information used as the input data for learning from the results of the machining simulation based on the machining program 200 executed by the machining simulation part 120, and outputs the acquired information to the prediction part 115. The machining simulation part 120 performs simulation of the machining program 200 using the method known in the prior-art technology such as the Japanese Patent Application Laid-Open No. 2012-243152.

The prediction part 115 performs prediction of the delay time due to servo control and due to machine movement using the learning model stored in the learning model storage part 114 using the machining-related information acquired from the machining simulation part 120 by the status observation part 112 as input data, and outputs the result to the correction time calculation part 132 included in the machining time prediction part 130.

The operations of the machining time prediction part 130, the reference machining time prediction part 131, and the correction time calculation part 132 of other functional means are the same as those described in connection with FIG. 7.

Up to this point, the embodiments of the present invention were described. However, the present invention is not limited to only the examples of the embodiments, and can be practiced in various aspects by adding appropriate changes thereto.

In the embodiments, there was shown the aspect of learning and use with one machine learning device 110. However, the leaning model constructed by the learning part 111, and stored in the learning model storage part 114 itself is the set of data indicating the learning results. For this reason, the learning model can also be configured to be shared with other machine learning devices 110 via, for example, an external storage device and networks (not shown). With such a configuration, in learning, with one learning model shared among a plurality of machine learning devices 110, respective machine learning devices 110 perform learning in parallel, which can shorten the time taken until the completion of learning. On the other hand, in use of the learning model, using the shared learning model, the delay time due to servo control and due to machine movement can also be predicted at each of a plurality of machine learning devices 110. The sharing method of the learning model is not limited to a specific method. For example, a learning model may be stored in the host computer of a factory to be shared among respective machine learning devices 110. Alternatively, a learning model can be stored on the server set by a manufacturer, and can be shared among the machine learning devices of customers.

Further, in the embodiments, the configurations of the machine learning devices 110 for learning and for prediction were individually described. However, the machine learning device 110 may include the configuration for learning and the configuration for prediction at the same time in such a case, the machine learning device 110 can perform prediction of the delay time due to servo control and due to machine movement using the learning model for prediction of the machining time by the numerical controller 1. For the subsequent machining by the numerical controller 1, the learning part 111 can perform a further additional learning.

Further, in the embodiments, the machining time prediction part 130 is shown in such a configuration as to include other respective functional means, but is not required to have such an inclusion relation. Even when respective functional means are mounted as respectively independent functional means, the functions and effects of the present invention will not be changed.

What is claimed is:

1. A machine learning device for learning a delay time due to servo control and due to machine movement, which are caused when performing machining on a workpiece based on a machining program in a numerical controller for controlling a machine having at least one axis based on the machining program, the machine learning device comprising:
a processor configured to
when the machining is performed, acquire information relating to the machining from the numerical controller at learning timings at which a command of a plurality of commands of the machining program is executed and at which a subsequent command of the plurality of commands is executed upon completion of execution of the command of the plurality of commands,
acquire an actual delay time due to servo control and due to machine movement, which are caused in the machining when the machining is performed,
perform supervised learning using the acquired information relating to the machining as input data, and using the acquired actual delay time due to servo control and due to machine movement as supervised data, wherein the processor is configured to omit, among the learning timings, a learning timing not causing the actual delay time from the supervised learning,
construct a learning model based on the supervised learning, and
store the learning model.

2. A machine learning device for predicting a delay time due to servo control and due to machine movement, which are caused when performing machining on a workpiece based on a machining program in a numerical controller controlling a machine having at least one axis based on the machining program, the machine learning device comprising:
a processor configured to
store a learning model constructed by
acquiring information relating to the machining at learning timings at which a command of a plurality of commands is executed and at which a subsequent command of the plurality of commands is executed upon completion of execution of the command of the plurality of commands,
acquiring an actual delay time due to servo control and due to machine movement, which are caused in the machining, and
performing supervised learning using the acquired information relating to the machining as input data, and using the acquired actual delay time due to servo control and due to machine movement as supervised data, while omitting, among the learning timings, a learning timing not causing the actual delay time from the supervised learning,
acquire information relating to machining of the workpiece based on the machining program calculated from machining simulation based on the machining program, and
predict, based on the learning model, a delay time due to servo control and due to machine movement from the acquired information relating to the machining.

3. The machine learning device according to claim 1, wherein the information relating to the machining includes at least any of
information relating to a command of the plurality of commands which has caused the delay time due to servo control and due to machine movement, and
information relating to a set of preceding and succeeding consecutive commands of the plurality of commands.

4. A system, comprising:
a machine learning device for predicting a delay time due to servo control and due to machine movement, which are caused when performing machining on a workpiece based on a machining program in a numerical controller controlling a machine having at least one axis based on the machining program, the machine learning device comprising a processor configured to store a learning model constructed by
    acquiring information relating to the machining at learning timings at which a command of a plurality of commands is executed and at which a subsequent command of the plurality of commands is executed upon completion of execution of the command of the plurality of commands,
    acquiring an actual delay time due to servo control and due to machine movement, which are caused in the machining, and
    performing supervised learning using the acquired information relating to the machining as input data, and using the acquired actual delay time due to servo control and due to machine movement as supervised data, while omitting, among the learning timings, a learning timing not causing the actual delay time from the supervised learning,
acquire information relating to machining of the workpiece based on the machining program calculated from machining simulation based on the machining program, and predict, based on the learning model, a delay time due to servo control and due to machine movement from the acquired information relating to the machining; and a machining time prediction device, comprising a further processor configured to predict a reference machining time not including the delay time due to servo control and due to machine movement based on the machining program, calculate a correction time for correcting the reference machining time based on the delay time due to servo control and due to machine movement predicted from the machining program by the machine learning device, and calculate a predicted machining time obtained by correcting the reference machining time by the correction time.

* * * * *